Sept. 5, 1944.  R. K. JEFFREY  2,357,742
VEHICLE
Filed Aug. 16, 1941  3 Sheets-Sheet 1

INVENTOR:
ROBERT K. JEFFREY,
BY Chas. M. Nissen
ATT'Y.

Sept. 5, 1944.  R. K. JEFFREY  2,357,742
VEHICLE
Filed Aug. 16, 1941  3 Sheets-Sheet 2
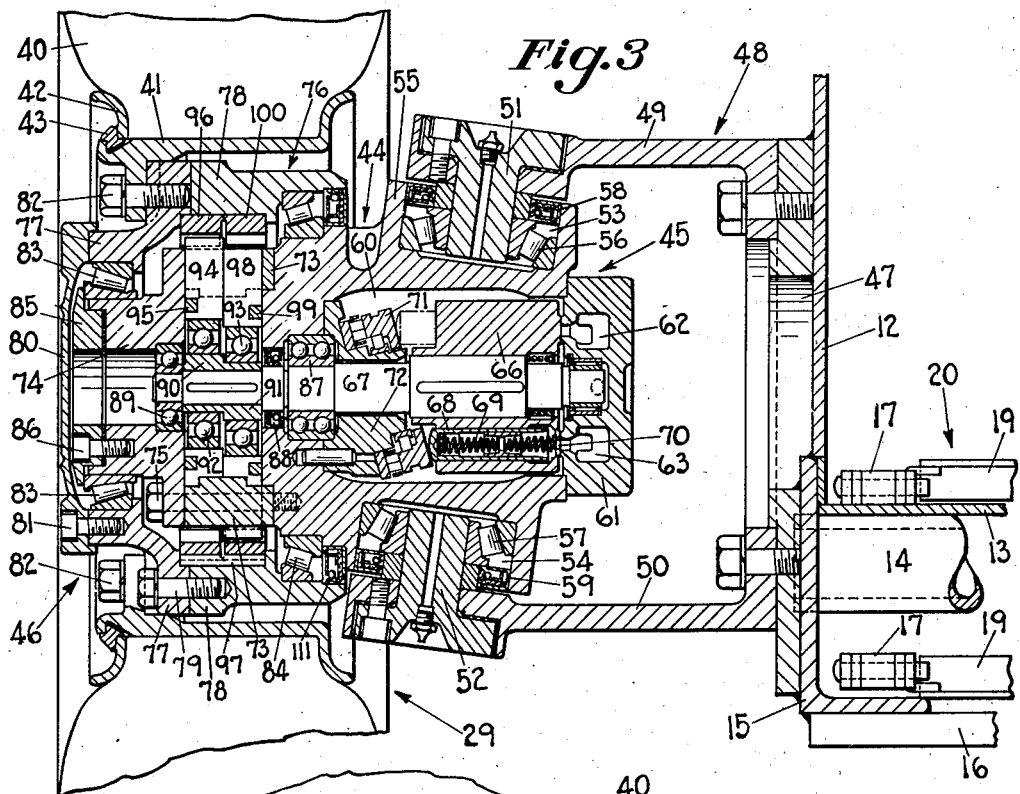
Fig. 3
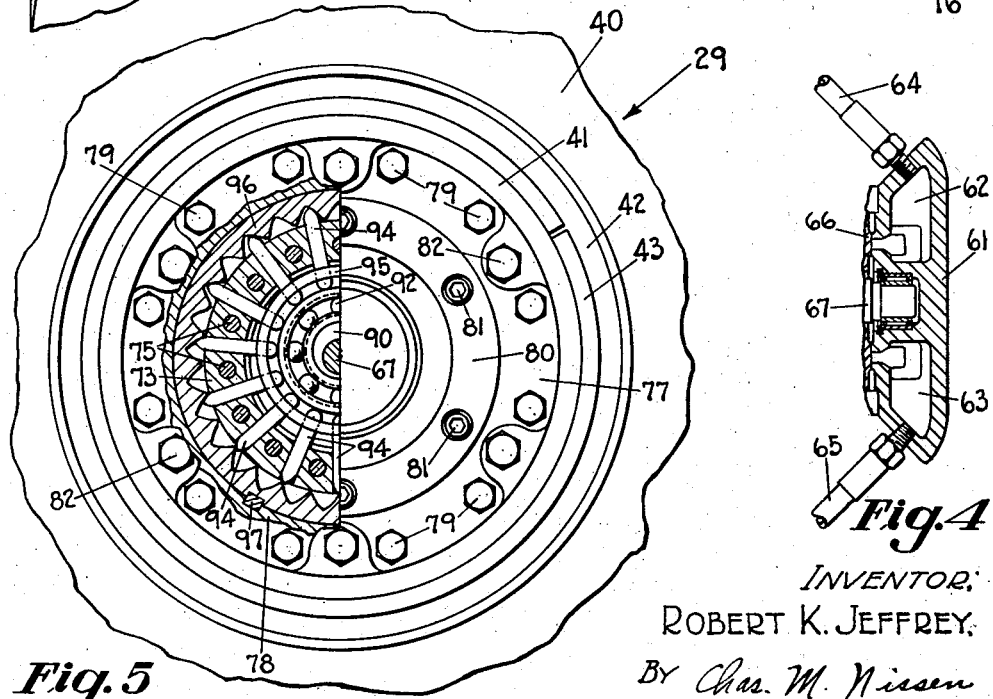
Fig. 5
Fig. 4
INVENTOR:
ROBERT K. JEFFREY.
BY Chas. M. Nissen
ATT Sept. 5, 1944. R. K. JEFFREY 2,357,742
VEHICLE
Filed Aug. 16, 1941 3 Sheets-Sheet 3

INVENTOR;
ROBERT K. JEFFREY,
By Chas. M. Nissen
ATT'Y.

Patented Sept. 5, 1944

2,357,742

UNITED STATES PATENT OFFICE 2,357,742

VEHICLE

Robert K. Jeffrey, Columbus, Ohio, assignor to The Jeffrey Manufacturing Company, a corporation of Ohio Application August 16, 1941, Serial No. 407,166

6 Claims. (Cl. 180—43)

This invention relates to a vehicle and particularly to a vehicle adapted to carry coal from a coal loading machine to a conveyor or to an elevator for feeding coal into mine cars.

An object of the invention is to produce an improved device of the above-mentioned type which is adapted to travel in the limited space available in many coal mines.

Another object of the invention is to provide improved and simplified mechanism for individually driving a traction wheel.

A further object of the invention is to provide an extremely compact and rugged motor-traction wheel assembly which is adapted particularly for use in a vehicle operable in a coal mine but which may have other and more general uses.

Still another object of the invention is to provide a mechanism for driving a traction wheel which employs a hydraulic engine, which hydraulic engine may operate either as a motor or as a pump so that it may drive the traction wheel or may be driven by the traction wheel, in which latter case the pump may be controlled to act as a brake.

Still a further object of the invention is to provide a very compact arrangement of parts including a wheel, such as a traction wheel, and a hydraulic motor for driving it through a compact gear reduction mechanism; the wheel, gear reduction mechanism and driving motor all being suspended so that the wheel may be adjusted to steer the vehicle of which it is a part.

Other objects of the invention will appear hereinafter, the novel features and combinations being set forth in the appended claims.

In the accompanying drawings,

Fig. 3 is an enlarged sectional elevational view showing in detail the preferred construction of one of the combined steering and driving wheels of the vehicle and the associated driving mechanism;

Fig. 4 is a sectional view showing the construction of the head of the hydraulic engine shown in Fig. 3, the view being taken at right angles to that of Fig. 3;

Fig. 5 is a side view of the wheel of Fig. 3 with its parts removed to show in detail the construction of the speed changing mechanism between the hydraulic engine and the wheel;

Figure 1:
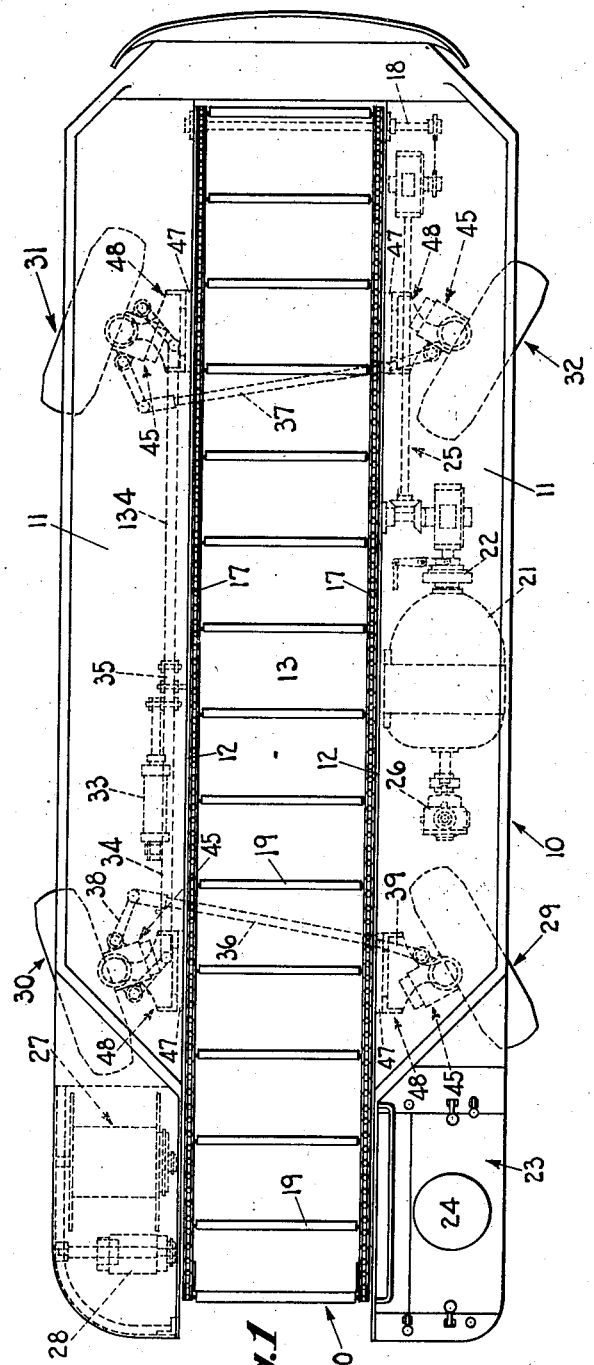
Fig. 1 is a plan view of the vehicle comprising my invention.
Figure 2:
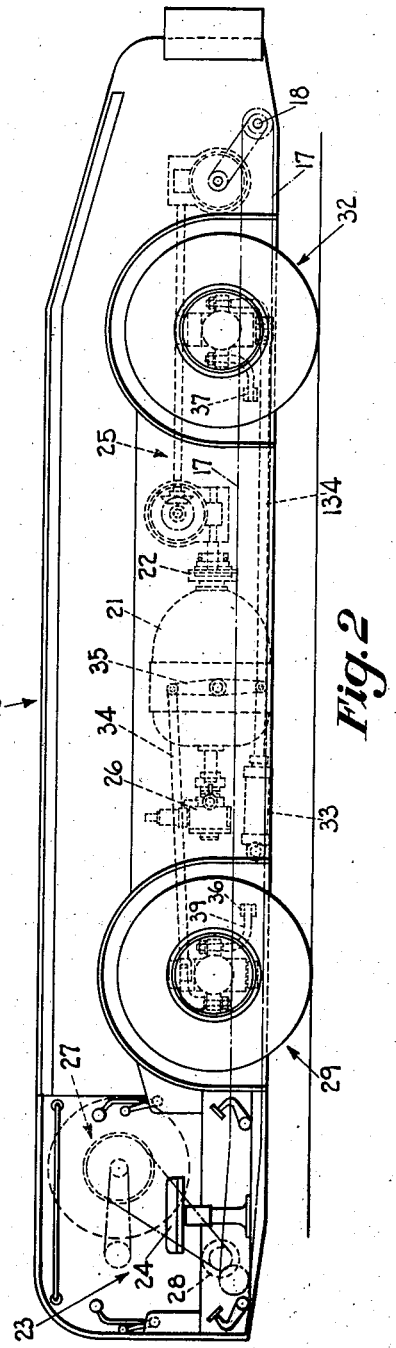
Fig. 2 is a side elevational view of the vehicle of Fig. 1.

Referring particularly to Figs. 1, 2 and 3 of the drawings, there is illustrated a vehicle in the form of a coal carrying buggy or shuttle car comprising the preferred embodiment of my invention. It will be understood that in many of its aspects it is not so limited. Said vehicle or shuttle car comprises a body 10 which is formed by opposite sloping side walls 11, 11 forming a receptacle for the material to be carried, such as coal, which sloping side walls lead to spaced vertical walls 12, 12 (see particularly Fig. 3), between which vertical walls 12, 12 there extends a bottom plate 13 supported by cross-pipes one of which is seen at 14 in Fig. 3 of the drawings, said cross-pipes 14 being connected at their opposite ends to angle sills, one of which is seen at 15 in Fig. 3 of the drawings, said sills 15 extending longitudinally of the body 10 and being also connected by transversely extending bars, one of which is seen at 16 in Fig. 3 of the drawings, which bars 16 are welded to the sills 15. The bottom plate 13 forms the bottom of the material receiving receptacle and of a conveyor which includes endless chains 17, 17 which extend between rear end drive sprockets carried by drive shaft 18 and idler head sprockets at the front of the vehicle. Transverse flights 19 are interconnected between the endless chains 17 to form the complete conveyor generally designated by the reference character 20. It is evident that material may be discharged from the car by driving the conveyor 20 forwardly, and the mechanism for doing this will now be described.

Along one side of the vehicle and below one of the sloping side walls 11 I provide a large electric motor 21 which is preferably the only electric motor on the vehicle and anything which is driven is ultimately supplied with energy from said motor 21. One end of the armature shaft of the motor 21 is connected through a clutch 22 which is operable from an operator's station 23 by an appropriate pair of levers preferably interconnected so that the operator may face either forwardly or rearwardly while riding on the seat 24. From the clutch 22 a gear train 25 extends through reduction mechanism to the drive shaft 18 of the conveyor 20.

The motor 21 also drives a hydraulic pump 26 which supplies hydraulic fluid under pressure which is employed to drive the traction wheels of the vehicle, to steer the vehicle and also to control the electric cable reel. The specific hydraulic control system is not a part of the invention herein claimed and so it is not illustrated in detail but it is to be understood that any hydraulic system may be employed consistent with the functions heerin described.

At the forward end of the body 10 substantially opposite the operator's station 23 is an electric cable winding mechanism 27 driven by a rotary hydraulic motor 28, said winding mechanism 27 per se being of standard construction. The car is also provided with four wheels 29, 30, 31 and 32 which are preferably all traction wheels and all steering wheels. Each of these wheels is of similar construction and so the description of wheel 29 will be understood to apply to all of them except for certain reversal of parts which is obvious from Fig. 1 of the drawings.

Referring particularly to Figs. 1 and 2 of the drawings, it will be seen that steering of all of the four wheels 29, 30, 31 and 32 is effected by a single hydraulic piston motor 33 which is connected by a longitudinally and forwardly extending rod 34 and by a longitudinally and rearwardly extending rod 134 interconnected by a pivot arm 35 to the forward and rearward pair of wheels which are pivoted about upwardly extending axes as hereinafter described in full detail, the forward wheels and rearward wheels each being interconnected by steering mechanism including tie rods 36 and 37, respectively, the opposite ends of each of which are connected to arms rigidly attached to the stub axle of the associated wheel; the arms associated with the tie rod 36 being seen at 38 and 39, respectively, and being associated with wheels 30 and 29, respectively. When motor 33 is operated and arm 35 swung about its center pivot, rods 34 and 134 move in opposite directions to swing the front pair of wheels and the rear pair of wheels in opposite directions, as illustrated in Fig. 1 of the drawings. As the construction of this steering mechanism is well understood because of its general use in automobile construction, it will not be described in further detail.

Attention is now directed particularly to Figs. 3, 4 and 5 of the drawings where the construction of the wheel 29 and the driving mechanism therefor is shown in detail, and the structure herein disclosed forms an important feature of my invention. Said wheel structure 29 includes a wheel formed by a tire, such as a pneumatic tire 40, mounted upon a rim 41 which may include as a part thereof a removable bead ring 42 and a retaining ring 43, though obviously the rim 41 may be of any conventional construction as may the tire 40, and may even embrace a type of wheel adapted to run on a track or a wheel adapted to drive an endless crawler such as of the Caterpillar type. The wheel including the rim 41 is mounted upon a stub axle 44 which includes within its construction a hydraulic engine 45 which is preferably operable either as a motor to drive the wheel or as a pump to be driven by the wheel. Said stub axle 44 also includes within its construction at least part of a speed changing mechanism 46 interposed between the engine 45 and the wheel 29; the rest of the speed changing mechanism, that is the rotating part thereof being rigidly attached to the rim 41. The entire mechanism comprising the wheel 29, hydraulic engine 45, and speed changing mechanism 46 is mounted as a unit for swinging movement about an inclined upwardly extending axis to provide for steering of the vehicle as previously mentioned, by mechanism now to be described.

Rigidly attached to the frame of the vehicle and specifically to a spacer 47 which in turn is rigidly attached to the vertical wall 12 and angle sill 15, is a bracket 48 having a top arm 49 and a bottom arm 50. Rigidly but removably attached to arms 49 and 50 are pivot pins 51 and 52, respectively, the axes of which are in alignment and extend upwardly, though preferably slightly inclined to the vertical. The pivot pins 51 and 52 extend into the top and bottom cups 53 and 54, respectively, formed in a metal casting 55 comprising the major portion of the stub axle 44 and also forming a housing of the hydraulic engine 45. The innermost end of the pivot pins 51 and 52 support the stub axle 44 for pivotal movement about their alined axes through tapered roller bearings 56 and 57 within the cups 53 and 54, respectively. Grease seals 58 and 59 seal the cups 53 and 54 with respect to said pivot pins 51 and 52 to retain grease therein for the roller bearings 56 and 57 while also keeping them free of dirt, grit and other foreign matter. The remote ends of the pivot pins 51 and 52 are provided with appropriate grease fittings leading through central bores of said pivot pins to the interior of the cups 53 and 54, respectively, so that said bearings 56 and 57 may be periodically lubricated.

That portion of the stub axle 44 which forms a housing of the hydraulic engine 45 is provided with a central opening or recess 60 which is closed by a head 61 shown in detail in Fig. 4 of the drawings, and provided with separate hydraulic chambers 62 and 63 communicating with flexible hydraulic hoses 64 and 65, respectively. The hydraulic engine 45 is so constructed that it may operate either as a pump or as a motor and is furthermore reversible either as a pump or as a motor. The flexible hoses 64 and 65 and particularly their mode of connection to the head 61 permit free oscillation of the stub axle 44 about the above-mentioned upright axis.

The hydraulic engine 45 includes within the recess a rotor 66 mounted upon and keyed to a shaft 67, the axis of which preferably coincides with the axis of rotation of the wheel 29. The rotor 66 is provided with a plurality of axially extending bores or cylinders within each of which is a reciprocating piston 68 which in the preferred form of my invention is of hollow construction, as illustrated in Fig. 3 of the drawings, and is provided with floating spring means 69 which continuously urges the said piston to the left as viewed in Fig. 3 of the drawings so that the engine 45 will operate as a pump as well as a motor. In some of the broader aspects of the invention herein claimed the engine 45 may be constructed merely to act as a motor, and in still even broader aspects the engine 45 may be an electric motor, but in the preferred embodiment of the invention as herein disclosed, said engine 45 is preferably of the hydraulic type and preferably acts either as a pump or as a motor and is reversible both as a pump and as a motor.

Each of the cylinders of the rotor 66 communicates by a port, such as port 70, with elongated arcuate ports associated with the chambers 62 and 63, respectively, during rotation of the rotor 66 so that each of said cylinders is successively connected to a discharge chamber and a pressure chamber. For example, under certain conditions, chamber 62 will be the discharge chamber and chamber 63 the pressure chamber, though under other conditions a reverse situation will prevail.

The other end of each of the pistons, such as piston 68, bears against a swash plate 71 lying in a plane at an angle to the axis of the shaft 67, the swash plate 71 being mounted for free rotary movement on anti-friction bearings with respect to a stationary swash plate supporting casting 72 which is keyed to the casting 55.

It is, of course, obvious that as the rotor 66 rotates, the pistons, such as a piston 68, reciprocate and each makes a complete stroke for each revolution of the rotor 66. Hydraulic engines of this general type are well known in the art. For this reason the above description is believed to suffice for a full understanding of the invention herein claimed. It may be stated, however, that for further details of the precise structure of the rotor, swash plate, pistons and associated mechanism of the hydraulic engine, reference is made of my co-pending application, Serial No. 348,765, filed July 31, 1940, now Patent No. 2,331,694, dated October 12, 1943, for an Improvement in hydraulic pump or motor, though of course other equivalent known engines may be employed.

The casting 55 not only forms a housing of the engine 45 but also forms a part of the speed changing mechanism 46 and at its left-hand end, as viewed in Fig. 3 of the drawings, it has rigidly attached to it a plunger holding guide ring 73 which is clamped rigidly to said casting 55 by a stub axle extension member 74, said member 74, ring 73 and casting 55 being rigidly connected by machine screws 75 which extend loosely through member 74 and ring 73 and are threaded into said casting 55.

Rigidly but removably attached to the rim 41 and within the radial confines thereof I provide a housing 76 forming a part of the speed changing mechanism 46 and also forming a hub for the wheel 29, said housing 76 being formed by members 77 and 78 which are removably attached together by machine screws 79 and by a removable cap 80 removably attached to the member 77 by machine screws 81. Said housing 76 is removably attached to the rim 41 by means of machine screws 82 which extend through an integral flange on the rim 41 and are threaded into the member 77. The housing or hub 76 is journaled on the stub axle 44 by spaced roller bearings 83, 84, the former being interposed between the extension member 74 and the housing member 77, and the latter being interposed between the casting 55 and the housing member 78. Said housing 76 and of course with it the rim 41 and entire wheel structure 29 is removably held on to the stub axle by means of a removable ring 85 which is removably attached to the extension member 74 as by machine screws 86. It is evident that by removing the screws 81, the cap 80 may be removed, whereupon access is had to the retaining ring 85. This ring 85 may be removed by removing screws 86 thus permitting removal of the wheel 29 and the housing 76 from the stub axle 44. This, of course, is not a normal operation and is described merely to indicate the possible disassembly of the unit. To replace a tire, the screws 82 are removed, whereupon the rim 41 and tire 40 are readily removable.

Attention is now directed to the mechanism which in addition to that previously described goes to make up the speed changing mechanism 46. It may be stated that the speed changing mechanism disclosed is of the type generally known in the art as a heliocentric reducer of the double eccentric type and I prefer this type of speed reducer to all others because I have found it possible to construct such a speed reducer with the desired high ratio of speed reduction between the wheel 29 and the engine 45 while requiring the minimum of space, thus making it possible to obtain a relatively high speed ratio in a compact speed changing unit which may be entirely incorporated within the radial confines of the wheel 29. It is, of course, to be understood that the compact structure provided by the stub axle 44 including the casting 55, also makes for this compactness of the driving unit which I have also found may be used with other types of speed changing mechanism as hereinafter described in connection with Figs. 6 and 7 of the drawings, but as above stated, I prefer the structure illustrated in Figs. 3, 4 and 5, for here the speed changing mechanism may have a gear ratio which is almost unlimited, and in practice may be anywhere from 20 to 1, to 100 to 1.

Intermediate its ends the rotor shaft 67 of the engine 45 is mounted in a ball bearing 87 carried in an appropriate recess in the casting 55 of stub axle 44, and an oil seal 88 is positioned adjacent said bearing 87 to provide a seal between said shaft 67 and said casting 55. The left-hand end of said shaft 67, as viewed in Fig. 3 of the drawings, is supported in a ball bearing 89 carried in the extension member 74 of the stub axle 44. Intermediate the ball bearing 89 and the oil seal 88 there is keyed to the shaft 67 a pair of eccentrics 90 and 91 which are preferably set 180° apart so that the reducer is in a balanced condition as hereinafter described more completely.

Mounted on the eccentrics 90 and 91 are ball bearings 92 and 93, respectively. The eccentric 90 and co-operating ball bearing 92 operate a series of radial plungers which extend radially through radial slots in the plunger holding guide ring 73, as clearly illustrated in Figs. 3 and 5 of the drawings. The plungers 94 are provided with a plunger retracting ring 95 which extends into a groove in each plunger 94 and insures retraction of each plunger as permitted by the eccentric 90. In other words, as the plungers 94 on one side are moved outwardly by eccentric 90, plungers diametrically opposite are retracted and intermediate plungers assume an intermediate position between the fully extended and fully retracted position in a manner obvious from an inspection of Fig. 5 of the drawings.

Co-operating with the tapered outer ends of the plungers 94 is a ring gear or circular rack 96 which is removably attached to the housing 76 and preferably to the member 78 thereof and held against rotation relatively thereto by key 97 (see Fig. 5). In other words, the circular rack 96 is keyed to the housing or hub 76.

Associated with the eccentric 91 and ball bearing 93 is a series of plungers 98 similar to the plungers 94 which are provided with a plunger retracting ring 99 and co-operate with the ring gear or circular rack 100 also removably attached to the member 78 while being keyed thereto against rotation by the key 97.

It is evident that for each rotation of the shaft 67, any given plunger 94 will make on complete oscillation, and the plungers 94 are so related to the teeth of the gear or rack 96 that for each such reciprocation said rack 96 travels the distance of one tooth. This, of course, effects a speed change between the rotation of the shaft 67 and rotation of the rack 96 and those parts attached to it, and the arcuate angle of rotation of the rack 96 for each reciprocation of a given plunger will determine this reduction ratio.

The contact between the outer end of each plunger 94 and the rack 96 is a combination of sliding and rolling action, and each plunger is working from the time it enters the rack tooth until it reaches the root of the tooth. Furthermore, generally over one-third of the plungers are always working at the same time in different progressive stages, thus insuring even distribution of the load on said plungers. Furthermore, the plungers 94 and 98 are working simultaneously and in diametrically opposite pairs so that the forces transmitted to the housing 76 are equalized at all times. The operation of the plungers 98 and associated ring 100 is, of course, the same as that of plungers 94 and associated ring 96, except that the two are 180° out of phase, as above described.

In the operation of the device, when the engine 45 is operating as a motor, hydraulic fluid under pressure will be supplied to one of the chambers 62 or 63 while the other acts as an exhaust chamber to cause rotation of the rotor 66 in one direction when the chamber 62 is a pressure chamber and in the opposite direction when chamber 63 is a pressure chamber. Rotation of the shaft 67 in one direction will operate through the aforedescribed cams 90 and 91, plungers 94 and 98 and rings 96 and 100 to rotate the housing 76 in one direction at a greatly reduced speed compared to the speed of rotation of shaft 67. Rotation of shaft 67 in the opposite direction will cause reverse rotation of the housing 76. Since the housing 76 is, of course, attached to the rim 41 of wheel 29, they will follow its movement and direction of rotation. Under such operating conditions the engine 45 will, of course, be operating as a motor. Conversely, rotation of the wheel 29 will cause much higher speed rotation of the shaft 67 and rotor 66 of the engine 45 and may drive it, under which conditions it will act as a pump, and by throttling the output thereof said pump may be employed as a brake. As previously stated, reverse rotation of the wheel 29 will produce reverse rotation of the shaft 67 when the engine 45 is being driven as a pump.

It should be particularly pointed out that the compactness of the complete unit including the engine 45 and speed changing mechanism 46 whereby they all consume a minimum of space and yet provide a very strong and rugged construction, is the result of a number of factors. One of the important contributions to this compactness, consistent with the very rugged construction, is the fact that the hub 44 forms in part a housing of the engine 45 and in part a non-rotary support for the wheel 29. Another factor which is particularly important where the reduction ratio is high, for example, 20 to 1, is the heliocentric type of speed reduction mechanism employed. A further factor is the provision of a hydraulic type of motor because this type of motor will produce a large torque for size or physical dimension than most other motors, such as an electric motor, and while, as above stated, in certain broad aspects of the invention an electric motor may be substituted for the motor or engine 45, in the preferred embodiment of the invention and in a more specific aspect thereof the hydraulic type of motor or engine is definitely to be preferred because of this smaller physical size for the same torque, as compared with the rated torque of an electric motor. Still another important factor is the particular type of hydraulic engine employed. That is, the hydraulic engine is of the axially reciprocating piston type because the overall dimensions of this type of hydraulic engine and particularly the circumference thereof are lower than many other types of hydraulic engines, such as the radial piston type, for example. Furthermore, another advantage of a hydraulic engine over an electric motor is that there is less temperature rise for a hydraulic motor due to the cooling effect of the hydraulic system on the hydraulic fluid as it flows to and from said hydraulic engine.

Figure 7:
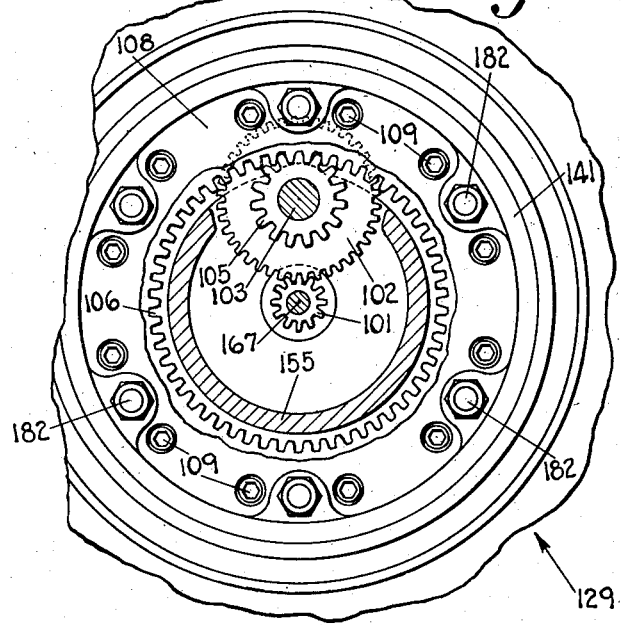
Fig. 7 is a view similar to Fig. 5, of the modified form of speed changing mechanism of Fig. 6.
Figure 6:
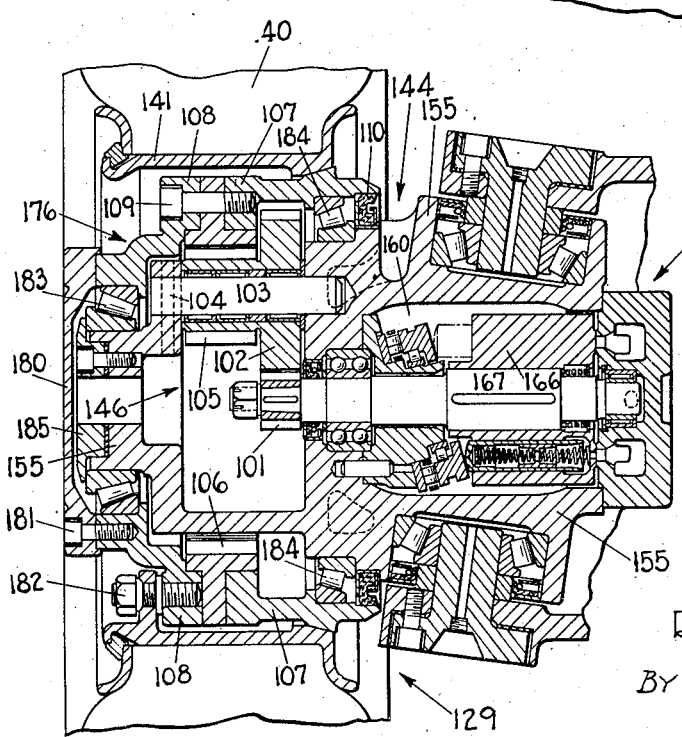
Fig. 6 is a view similar to Fig. 3, showing a modified form of speed changing mechanism between the hydraulic engine and the wheel.

From the above description particularly of the speed changing mechanism 46 and the speed ratios available with the particular heliocentric type of mechanism disclosed, it is evident that this arrangement is particularly adaptable where high torques are required, and the engine, speed changing mechanism and wheel construction of Figs. 3, 4 and 5 is particularly useful to vehicles of heavy construction or those required to carry heavy loads, requiring said relatively high torques.

Where the vehicle is of lighter construction or the total weight of material to be moved is lighter, a more simple type of speed changing mechanism may be employed, and attention is now directed particularly to Figs. 6 and 7 of the drawings wherein I have shown a modified form of speed changing mechanism 146 which may be employed where the speed changing ratio is lower than that above suggested, though the speed range of the mechanism here illustrated may be anywhere from 1 to 1, to 20 to 1, as a possible range.

It is to be understood that except for differences definitely pointed out, the structure disclosed in Figs. 6 and 7 will be the same as that of Figs. 3, 4 and 5. Referring particularly to said Figs. 6 and 7, I provide a stub axle 144 comprising a casting 155 having an opening or recess 160 within which is mounted a shaft 167 carrying rotor 166, the casting 155 forming a housing for the hydraulic engine 145. The only essential difference between the engine 145 and the previously described engine 45 is that the shaft 167 is shorter than the shaft 67. Said shaft 167 is provided with a pinion 101 which meshes with a larger gear 102 mounted on a pivot pin 103 which is held in the right-hand portion of the casting 155 which forms the non-rotary or axle part of said stub axle 144. A retaining key 104 is provided to maintain the pin 103 in place.

Formed integral with the gear 102 is a smaller gear 105 which meshes with an interior ring gear 106 which has a flange rigidly attached to and forming a part of the housing 176 of the speed changing mechanism 146; said housing 176 being formed by members 107 and 108 which are bolted to opposite sides of the flange of said ring gear 106 by means of machine screws 109. The housing 176 also includes a removable cap 180 removably attached by machine screws 181. Also removably attached to the housing 176 by means of lugs and bolts 182 is the rim 141 of the wheel 129. Said rim 141 carries a pneumatic or other type of tire 140 or it may be similar in construction to the rim 41 previously described.

From the description so far given it is, of course, evident that in describing the construction shown in Figs. 6 and 7, reference characters are used the same as those used to describe similar elements of the mechanism of Figs. 3, 4 and 5, except that the number has been increased by one hundred.

To secure the wheel 129 for rotary movement on the hub 144 I provide spaced roller bearings 183 and 184 and a removable ring 185. A grease seal 110 is interposed between the inner flange of the housing 176 and the adjacent portion of the non-rotary stub shaft 144. It should also be pointed out that the device of Figs. 3, 4 and 5 contains a similar grease seal seen at 111. These grease seals may be of any standard construction and I have illustrated different forms in the two devices. The function of both is the same and is, of course, to keep grease on the wheel bearings 83 and 84 or 183 and 184 and also to prevent dirt, grit or other foreign matter from reaching said bearings.

The structure by which the casting 155 is supported for swinging movement about an upwardly extending inclined axis is the same in Figs. 6 and 7 as the structure of Figs. 3, 4 and 5 and therefore will not be described again.

In the structure disclosed in Figs. 6 and 7, when the engine 145 is operating as a motor, the shaft 167 will be driven and will drive the wheel 129 through the speed changing mechanism 146, the gear train being from shaft 167 through pinion 101, gear 102, integral gear 105 and ring gear 106 meshing therewith which is rigidly attached to and forms a part of the housing or hub 176 which in turn is rigidly attached to the wheel 129 through the rim 141. This speed changing mechanism, of course, is reversible and so in case the wheel 129 is acting as a driver, the shaft 167 will be driven and the engine 145 will operate as a pump, and like the engine 45 its hydraulic fluid output can be throttled, whereupon it will act as a brake. It is, of course, evident that the double function of the engine 145 as well as the engine 45 to act either as a brake or as a driving mechanism contributes appreciably to the simplicity of the mechanism because it eliminates completely the necessity for the conventional braking mechanism, with a consequent reduction in equipment and weight.

Except for the fact that the possible range of speed ratios and particularly the high speed ratios can not be derived from the type of speed changing mechanism 146 disclosed in Figs. 6 and 7 of the drawings, as can be obtained with the speed changing mechanism 46 of Figs. 3, 4 and 5, all of the advantageous characteristics of the structure of Figs. 3, 4 and 5 are presented in the structure of Figs. 6 and 7. It is, of course, evident that the speed changing mechanism of Figs. 6 and 7 is less complicated, less expensive and requires less space than that of the mechanism of Figs. 3, 4 and 5, and consequently wherever the speed ratio obtainable for the mechanism of Figs. 6 and 7 is adequate for the purpose, this structure is to be preferred and this will apply to a great many, if not most, vehicles and particularly to those shuttle cars and similar equipment.

In the operation of the vehicle it is evident that in the preferred embodiment of my invention all four wheels are traction wheels as well as steering wheels, though it is of course evident that as to certain aspects of my invention traction may be limited to either the front wheels or the rear wheels, and steering may likewise be limited to either the front wheels or the rear wheels, and the traction may be on the same pair of wheels or traction may be applied to one pair of wheels and steering to the other. I prefer, however, to have all wheels both traction and steering wheels as this reduces the necessary size of any hydraulic engine associated with a traction wheel and also makes possible the turning of the machine in a minimum of space.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a vehicle, the combination with a casting proving a stub axle, of a wheel mounted thereon for rotation, mechanism mounting said stub axle for pivotal movement, a hydraulic driving motor provided with axially extending pistons in a rotor within said axle, said axle forming at least part of the housing and stator of said motor, and gearing driven by said rotor and driving said wheel.

2. In a vehicle, the combination with a casting providing a stub axle, of a traction wheel, means including a bearing mounting said wheel on said axle for rotation, a hydraulic engine having axially extending pistons in a rotor within said axle, said axle thereby forming at least in part a housing of said engine, and speed changing gearing interconnecting the rotor and said wheel.

3. Driving mechanism for a vehicle comprising a wheel, a hydraulic driving motor and a speed changer connected between said motor and wheel, said speed changer including a rotating member attached to said wheel and comprising a housing of said speed changer, a non-rotating member having a portion extending into said housing, spaced bearing means interposed between said non-rotating member and said rotating member to provide for rotation of the latter while being supported by the former, said non-rotating member also having a portion forming the stator of said driving motor, said driving motor also including a rotor having axially extending pistons and mounted on a shaft extending along the axis of rotation of said wheel, and said speed changer also including gear means connecting the motor shaft with said rotating member.

4. Driving mechanism for a vehicle comprising a wheel, a driving motor and a speed changer connected between said motor and wheel, said speed changer including a rotating member attached to said wheel and comprising a housing of said speed changer, a non-rotating member having a portion extending into said housing, spaced bearing means interposed between said non-rotating member and said rotating member to provide for rotation of the latter while being supported by the former, said non-rotating member also having a portion forming the stator of said driving motor, said driving motor also including a rotor having axially extending pistons and mounted on a shaft, and said speed changer also including gear means connecting the motor shaft with said rotating member, and spaced bearing means mounting said non-rotating member for swinging movement along an axis other than parallel with the axis of rotation of said wheel.

5. A motorized wheel including a single casting providing a hydraulic motor housing and also at least in part a reduction gearing housing, a hydraulic motor rotor mounted for rotation in said housing formed by said casting, a wheel mounted on laterally spaced roller bearings on said casting, the outer of said bearings being smaller than the inner one whereby the outer bearing is mounted on a reduced portion of said casting as compared with the portion on which the inner bearing is mounted, a final drive gear on the interior of said wheel positioned between said bearings, additional reduction gears providing a driving connection between said rotor and said wheel gear and at least in part being housed within said casting, and means formed as an integral part of said casting for mounting the entire motorized wheel for steering as a unit, whereby the load on said wheel is transmitted from the bearings through an integral casting to said mounting means.

6. A motorized wheel including a single casting providing a motor housing and also at least in part a reduction gearing housing, a motor rotor mounted for rotation in said housing formed by said casting, a wheel mounted on laterally spaced roller bearings on said casting, the outer of said bearings being smaller than the inner one whereby the outer bearing is mounted on a reduced portion of said casting as compared with the portion on which the inner bearing is mounted, a final drive gear on the interior of said wheel positioned between said bearings, additional reduction gears providing a driving connection between said rotor and said wheel gear and at least in part being housed within said casting, and means formed as an integral part of said casting for mounting the entire motorized wheel for steering as a unit, whereby the load on said wheel is transmitted from the bearings through an integral casting to said mounting means.

ROBERT K. JEFFREY.